United States Patent
Bornes

(10) Patent No.: US 9,468,876 B2
(45) Date of Patent: Oct. 18, 2016

(54) FILTER BOX, A FUEL CIRCUIT FOR FEEDING FUEL TO AN ENGINE, AND AN AIRCRAFT

(71) Applicant: AIRBUS HELICOPTERS, Marignane (FR)

(72) Inventor: Sylvain Bornes, Coudoux (FR)

(73) Assignee: Airbus Helicopters, Margnane (FR)

( * ) Notice: Subject to any disclaimer, the term of this patent is extended or adjusted under 35 U.S.C. 154(b) by 171 days.

(21) Appl. No.: 14/546,283

(22) Filed: Nov. 18, 2014

(65) Prior Publication Data

US 2015/0136677 A1    May 21, 2015

(30) Foreign Application Priority Data

Nov. 20, 2013  (FR) ..................... 13 02673

(51) Int. Cl.
*B01D 35/027* (2006.01)
*B01D 35/153* (2006.01)
(Continued)

(52) U.S. Cl.
CPC .............. *B01D 35/30* (2013.01); *B01D 29/05* (2013.01); *B01D 29/56* (2013.01); *B01D 29/92* (2013.01); *B01D 35/027* (2013.01); *B01D 46/008* (2013.01); *B64D 37/005* (2013.01); *B64D 37/08* (2013.01); *F02C 7/22* (2013.01); *F02M 37/007* (2013.01); *F02M 37/0088* (2013.01); *F02M 37/0094* (2013.01); *F02M 37/025* (2013.01); *F02M 37/22* (2013.01); *B01D 2201/307* (2013.01); *B60K 2015/03105* (2013.01); *F02M 2037/228* (2013.01); *F05D 2260/607* (2013.01); *Y02T 50/675* (2013.01)

(58) Field of Classification Search
None
See application file for complete search history.

(56) References Cited

U.S. PATENT DOCUMENTS 2,953,156 A    9/1960  Bryant
2,961,130 A    11/1960 Adams
(Continued)

FOREIGN PATENT DOCUMENTS

EP    0278755    8/1988
EP    0806318    11/1997
(Continued)

OTHER PUBLICATIONS

French Search Report for FR 1302673, Completed by the French Patent Office Jul. 23, 2014, 6 Pages.

*Primary Examiner* — Thomas M Lithgow
(74) *Attorney, Agent, or Firm* — Brooks Kushman P.C.

(57) ABSTRACT

A filter box (10) having at least one main compartment (20) in fluid flow communication with a main tank (6) and with a transfer pump (8) for feeding with fuel, together with at least one secondary compartment (30) in fluid flow communication with a secondary tank (7) and an ejector (9). The box includes one grid (40) per compartment co-operating with a system for moving the grid in translation in order to be extracted from said compartment through a slot (23, 33) present in a bottom (14) of the compartment (20, 30), and a leaktight shutter system (50) for each compartment (20, 30) for preventing fuel escaping from said slot (23, 33) of a compartment (20, 30) in the absence of said grid (40).

14 Claims, 3 Drawing Sheets

(51) Int. Cl.
*F02M 37/22* (2006.01)
*B01D 35/30* (2006.01)
*B01D 29/05* (2006.01)
*B01D 29/56* (2006.01)
*B01D 29/92* (2006.01)
*F02M 37/00* (2006.01)
*B01D 46/00* (2006.01)
*B64D 37/00* (2006.01)
*B64D 37/08* (2006.01)
*F02M 37/02* (2006.01)
*F02C 7/22* (2006.01)
*B60K 15/03* (2006.01)

(56) References Cited

U.S. PATENT DOCUMENTS

| | | |
|---|---|---|
| 3,259,066 A | 7/1966 | Williams et al. |
| 3,275,061 A | 9/1966 | Williams et al. |
| 3,507,391 A * | 4/1970 | Rosaen ............... B01D 35/143 210/234 |
| 5,797,373 A | 8/1998 | Kleppner et al. |
| 6,341,623 B1 * | 1/2002 | Channing ............ B60K 15/077 123/514 |
| 6,505,644 B2 * | 1/2003 | Coha .................. F02M 37/0094 123/514 |
| 6,832,602 B2 * | 12/2004 | Tanimura ............ F02M 37/025 123/509 |
| 8,352,200 B2 | 1/2013 | Contini et al. |
| 2009/0000844 A1 | 1/2009 | Castillo et al. |

FOREIGN PATENT DOCUMENTS

| | | |
|---|---|---|
| FR | 2949352 | 3/2011 |
| JP | 2011032898 | 2/2011 |

* cited by examiner

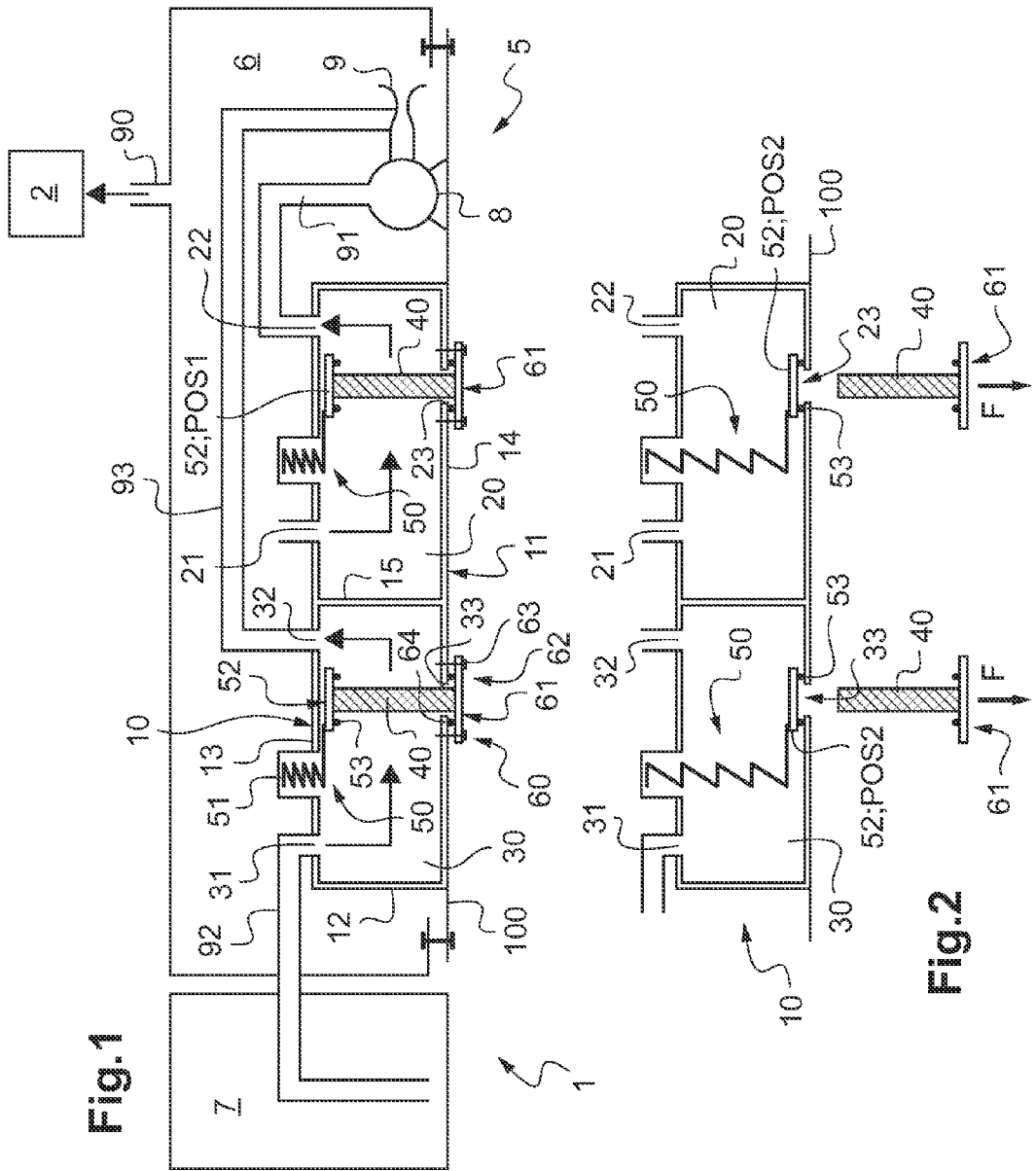

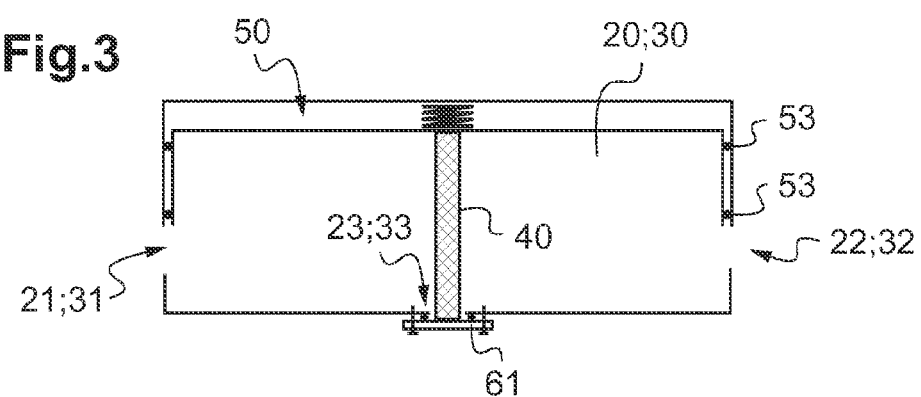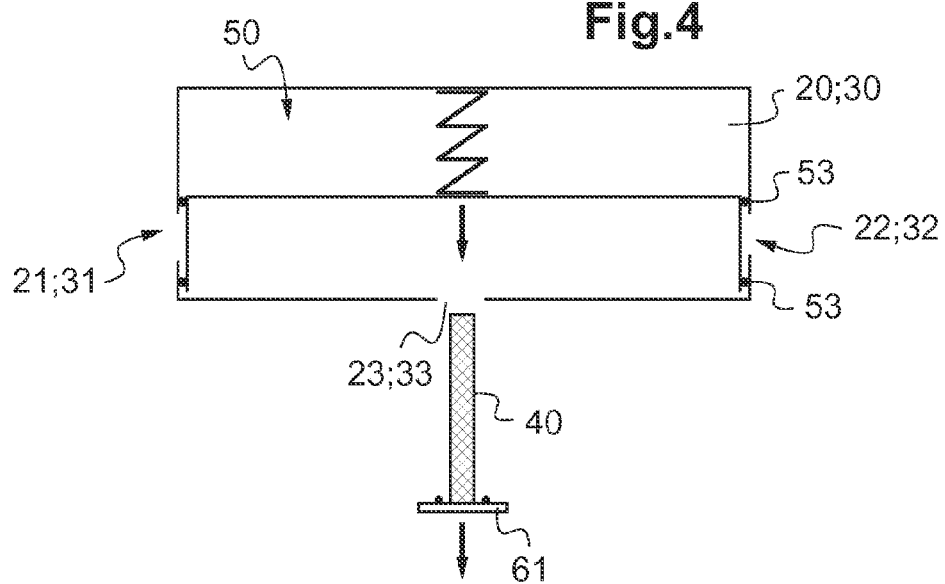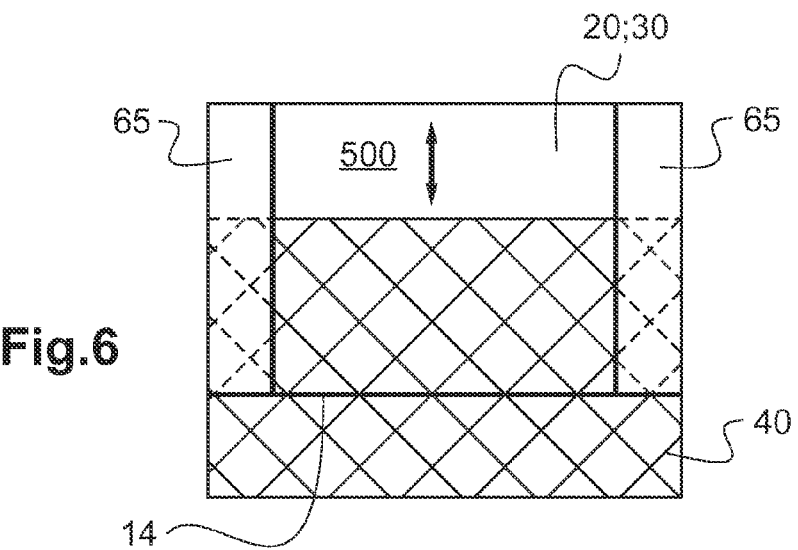

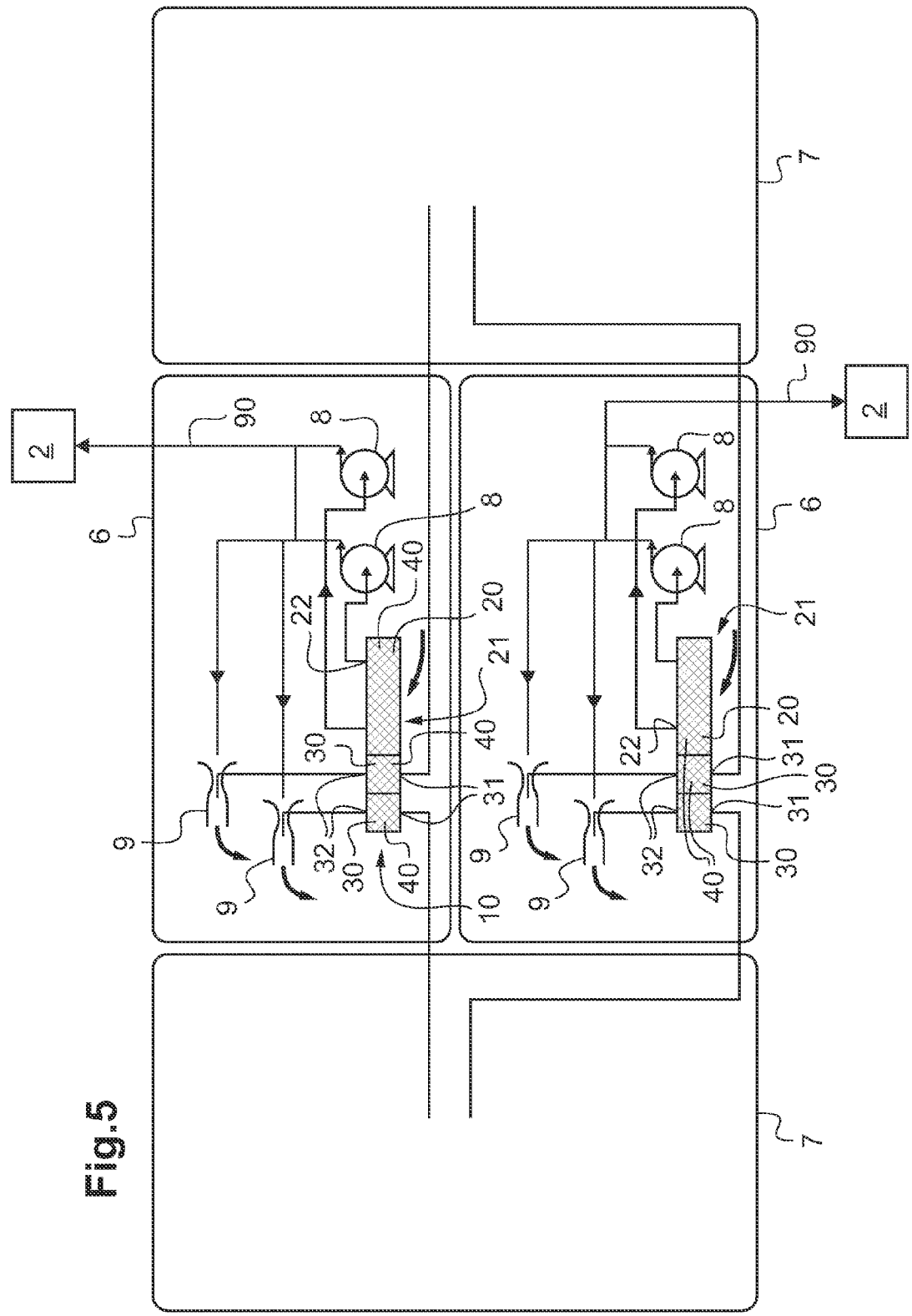

FILTER BOX, A FUEL CIRCUIT FOR FEEDING FUEL TO AN ENGINE, AND AN AIRCRAFT

CROSS REFERENCE TO RELATED APPLICATION

This application claims priority to French patent application No. FR 13 02673 filed on Nov. 20, 2013, the disclosure of which is incorporated in its entirety by reference herein.

BACKGROUND OF THE INVENTION (1) Field of the Invention

The present invention relates to a filter box, to a fuel circuit for feeding fuel to an engine and provided with the filter box, and to an aircraft including the fuel circuit.

The invention thus lies in the technical field of aircraft, and more specifically of rotorcraft.

(2) Description of Related Art

Rotorcraft are aircraft presenting the particular feature of being fitted with at least one rotary wing providing them at least with lift, and possibly also with propulsion and/or the ability to maneuver in flight. Such a rotary wing is driven in rotation by a power plant comprising one or more engines.

Under such circumstances, a fuel circuit of an aircraft may comprise a fuel storage tank that may be installed in the bottom section of a rotorcraft, for example.

Conventionally, a fuel circuit comprises one main tank per engine, each main tank being in fluid flow communication with an engine. Such a main tank is sometimes referred to by the person skilled in the art as a "feeder". Fuel is then drawn from the main tank in order to be taken to the associated engine. The fuel may be conveyed from the main tank to an engine by a booster pump arranged in the main tank and/or by a suction pump of an engine.

The fuel circuit may also include at least one secondary tank in fluid flow communication with at least one main tank.

For example, the main tank may be arranged inside a secondary tank, or it may be arranged beside a secondary tank.

The main tank is thus formed by an enclosure of volume suitable for enabling an engine to be fed with fuel for an operating duration that is defined by certification regulations.

On a twin-engine aircraft, the fuel circuit may comprise two main tanks and two secondary tanks, each secondary tank being in fluid flow communication with each main tank.

Furthermore, a main tank may be fed with fuel from a secondary tank via a transfer system making use of a transfer pump housed inside the main tank. The transfer system then has an ejector placed inside a secondary tank for conveying fuel from the secondary tank to the main tank.

Thus, a transfer pump arranged in a main tank is connected by a pipe to at least one ejector arranged in a secondary tank. The ejector is then connected to the main tank via another pipe.

By using a flow of a primary stream of fuel generated by the transfer pump inside the transfer system and taken from the main tank, such an ejector serves to capture a secondary stream of fuel in the secondary tank. The secondary stream of fuel is then delivered together with the primary stream out from the ejector into the main tank via a pipe provided for this purpose. Since the capacity of the main tank is limited, the main tank may be fitted with an overflow device for restoring any excess fuel to a secondary tank as an overflow.

Given the proximity between a main tank and a secondary tank, and given the small head losses induced by the transfer system, the transfer pump may be a low pressure pump; as an indication, it may deliver a pressure of the order of less than 200 millibars (mB), and more commonly less than 100 mB. The transfer pump may in particular be driven by electricity taken from the on-board electrical power supply network of the aircraft.

Furthermore, in general terms, an ejector comprises an upstream nozzle for admitting a primary fluid stream and leading to a main channel having a constricted portion. A secondary channel for admitting a secondary fluid stream opens out into the main channel upstream from the nozzle. The flow of the main stream inside the main channel acts by suction to capture the secondary stream of fluid through the secondary channel. The secondary stream and the primary stream mix together upstream from the constricted portion, and then the overall fluid stream resulting from this mixing is discharged from the ejector downstream from the constricted portion. The concepts of upstream and downstream should be considered relative to the flow direction of the various streams through the ejector.

The ejector then operates by the Venturi effect in order to generate a stream of fuel going from a secondary tank to a main tank.

Furthermore, the equipment of a transfer system usually includes filter grids for preventing polluting material being transferred to an engine in order to prevent the equipment becoming clogged. Booster pumps, ejectors, and transfer pumps thus sometimes include filter grids for filtering out pollution. Such grids are sometimes referred to as "strainers" or "screens".

These grids are mounted on the equipment in order to filter fuel.

Grids are inspected during maintenance operations in order for them to be cleaned in the event of becoming clogged by pollution. Nevertheless, grids are difficult to access.

On a rotorcraft having tanks arranged in the bottom section of the rotorcraft, each tank is of low height. Furthermore, the tanks are difficult to access. Consequently, an operator may need to remove an entire tank in order to access a grid of an ejector, for example.

Periodically cleaning filter grids in equipment of a fuel circuit can thus lead to the fuel circuit being emptied, then to the tanks being opened, and then to the equipment being disassembled. That method requires maintenance operations that are burdensome, lengthy, and expensive.

Document U.S. Pat. No. 3,275,061 (Boeing Co.) describes a feed ejector installed in a fuel feed line for an engine of an aircraft, and more particularly of an airplane.

The pressure of the fuel in a feed line is then increased by the ejector.

Certain aircraft may be provided with ejectors for maximizing the pressure of a stream of fuel before it is admitted into an engine.

For reasons of safety, that technical option may be difficult to implement in a rotorcraft having a tank that is remote from the engine to be fed. That configuration involves arranging pipes that follow sinuous paths in the rotorcraft in order to convey fuel under high pressure to an engine.

Document U.S. Pat. No. 3,259,066 describes an architecture for feeding an engine with the help of an ejector.

Document FR 2 949 352 discloses a system for monitoring a fluid filter for an aeroengine by comparing pressure measurements between upstream and downstream of the filter.

Document EP 0 806 318 discloses a fuel installation for a vehicle, the installation comprising a tank having a plurality of compartments with bottoms that are separate from one another. The installation has a transfer unit for taking fuel from the tank. The transfer unit is connected to a fuel-taking device present in a first compartment and in fluid flow communication with a second compartment via a suction duct. The transfer unit has orifices opening out into the first compartment.

Also known are Documents U.S. Pat. No. 2,953,156, US 2009/000844, U.S. Pat. No. 2,961,130, EP 0 278 755, and JP 2011 032898.

BRIEF SUMMARY OF THE INVENTION

An object of the present invention is thus to provide a filter box that makes it easier to perform a cleaning operation on filter grids. Such a filter box may then be arranged in a fuel circuit, in particular a fuel circuit of an aircraft.

Thus, the invention provides in particular a filter box for filtering fuel upstream from at least one ejector and from at least one fuel transfer pump.

The filter box comprises:
- at least one compartment named "main compartment" having an inlet named "main inlet" for the purpose of being in fluid flow communication with a main tank, and one outlet named "main outlet" per transfer pump to be fed;
- at least one compartment named "secondary compartment", each secondary compartment having an inlet named "secondary inlet" for the purpose of being in fluid flow communication with a secondary tank distinct from the main tank, and an outlet named "secondary outlet" for the purpose of being in fluid flow communication with an ejector;
- one grid per compartment for filtering fuel passing through the compartment, each grid co-operating with a system for moving in translation in order to be extracted from said compartment via a slot present in a bottom of the compartment; and
- one leaktight shutter system per compartment having the function of preventing fuel escaping via said slot from a compartment in the event of said grid being absent.

It should be observed that the term "compartment" when used without the adjectives "main" and/or "secondary" applies equally well to a main compartment and to a secondary compartment.

Likewise, the term "inlet" used without the adjectives "main" and/or "secondary" applies equally well to a main inlet and to a secondary inlet, and the term "outlet" used without the adjectives "main" and/or "secondary" applies equally well to a main outlet and to a secondary outlet.

The filter box thus the grids makes it possible to offset the filter grids associated with fluid transfer equipment in a member enabling the grids to be extracted from the aircraft without emptying the fuel circuit.

In order to clean the filter grids, an operator operates the systems for moving in translation in order to extract each filter grid. There is no need to empty the fuel circuit insofar as each shutter system serves to avoid fuel leaking to the outside through the filter box.

The shutter system can minimize the amount of fuel that escapes from the fuel circuit when extracting a filter grid from the filter box.

Under such circumstances, an operator may place a fairing under the aircraft when performing a cleaning or visual inspection operation on the filter grid from under the tank under examination, in order to avoid spreading any fuel on the ground.

Maintenance operations thus tend to be made easier compared with an operation involving dismantling a tank.

Furthermore, the filter box makes it possible to avoid opening the tanks for inspection operations.

The filter box thus includes a shutter system enabling the filter grids to be extracted simply and without emptying the fuel circuit. In addition, all the filter grids of a network can be extracted during the same operation by taking them from the filter boxes in question.

Each filter box may thus be installed in a main tank. The invention thus avoids using devices that are located outside the tanks and in particular outside a main tank, and this can help reduce the risk of fire.

Furthermore, by setting the filter grids of a fluid flow network aside in a filter box, the invention can make it easier to arrange fuel transfer ejectors of the network in only the main tank of the network.

It is then possible to envisage a common fastener plate for the ejectors and for the pumps in a given network, thereby simplifying the layout of the fuel circuit.

In addition, the filter box then makes it possible to have a single pipe between a main tank and a secondary tank, unlike solutions involving an ejector in a secondary tank since those solutions require two pipes to be used.

A main tank may thus be provided with a filter box that can be opened mechanically and automatically during maintenance, thereby enabling the filter grids to be extracted. For example, the shutter system may isolate the volume of fuel situated around the filter grids from the remainder of the main tank.

The filter box then possesses a plurality of inlets/outlets associated with the various circuits for filtering (engine boost, ejector circuit, intergroup transfer).

The fuel transfer equipment (pumps, ejectors) then no longer needs to be independently fitted with filter grids. The filter function is set aside in a filter box.

The filter box may also include one or more of the following characteristics.

Thus, at least one system for moving in translation may include firstly a support secured to a grid and secondly a fastener system for fastening the support in reversible and leaktight manner to the bottom of the box or to a structure situated under the filter box.

The system for moving in translation is then a system that is relatively simple. The fastener system may for example comprise screw-fastener members. By unscrewing these members an operator can thus remove a filter grid from the support.

At least one system for moving in translation may also include at least one guide rail present in a compartment.

The movement in translation of each filter grid is thus guided by at least one guide rail in order to guarantee that the filter grid is properly positioned.

In addition, the shutter system of a compartment may include an elastic system and at least one slide, each slide co-operating by shape interference with a grid, the grid pushing the slide into an "open" position when the grid is arranged in a compartment. The resilient system also tends to position the slide in a "closed" position in the absence of a grid.

The term "slide" is used to designate a part that is movable relative to a guide, such as a rail.

The shutter system presents the advantage of being a mechanical system that automatically places a slide in a closed position in the absence of a grid.

Under such circumstances, at least one slide co-operates in a first embodiment by shape interference with a slot in a bottom of a compartment for shutting said slot in the closed position. The slide is then pressed against the slot in order to shut it.

In a second embodiment, at least one slide co-operates by shape interference with each inlet and each outlet of a compartment in order to shut said inlet and outlet in said closed position.

For example, a single slide may have a plurality of facets arranged against the inlets and the outlets of a compartment when in the closed position.

Alternatively, the filter box may include one slide per inlet and outlet of each compartment.

In addition, at least one slide may include a sealing gasket pressed against a peripheral casing of the filter box in the closed position in order to maintain good sealing.

In one version, said filter box optionally has two secondary compartments and one main compartment. Each secondary compartment is then connected to a respective secondary tank.

In addition to a filter box, the invention provides a fuel circuit incorporating at least one filter box of this type.

Thus, a fuel circuit is provided for feeding fuel to at least one engine, the fuel circuit being provided with at least one main tank in fluid flow communication with an engine, and at least one secondary tank in fluid flow communication with the main tank, the fuel circuit including at least one transfer pump arranged in the main tank and at least one ejector connected to the transfer pump.

The fuel circuit includes a filter box arranged in each main tank, each filter box being in accordance with the invention and comprising:

- at least one main compartment provided with a main inlet in fluid flow communication with the main tank receiving the filter box, the main compartment being provided with a main outlet connected to at least one transfer pump arranged in the main tank receiving the filter box;
- at least one secondary compartment, each secondary compartment having a secondary inlet connected to a secondary tank distinct from the main tank and a secondary outlet connected to an ejector that is arranged in the main tank receiving the filter box;
- one grid per compartment for filtering fuel passing through the compartment, each grid co-operating with a system for moving in translation in order to be extracted from said compartment through a slot present in a bottom of the compartment; and
- one leaktight shutter system per compartment for the purpose of preventing fuel escaping via said slot from a compartment in the absence of a grid.

The circuit may include one or more of the following characteristics.

Thus, said filter box may include a single main compartment connected to at least one transfer pump, each transfer pump being connected to at least one ejector. Each transfer pump is thus in fluid flow communication with the main compartment in order to draw fuel from the main compartment.

Furthermore, at least one filter box may include a secondary compartment co-operating with a single ejector for each secondary tank that is connected to the main tank receiving the filter box. Each secondary compartment then co-operates with a single secondary tank and a single ejector.

Consequently, the filter box may have one compartment per tank in a group of tanks Furthermore, said fuel circuit may include two main tanks and two secondary tanks, each main tank being connected to the two secondary tanks via respective filter boxes arranged in the main tanks Such a circuit may comprise two groups of tanks for feeding two engines, each group having a main tank and the two secondary tanks Each group is then provided with a filter box arranged in the main tank of the group for filtering fuel upstream from at least one transfer pump and from ejectors arranged in the corresponding main tank.

Each engine may thus draw fuel from a main tank without assistance.

Nevertheless, at least one transfer pump arranged in a main tank may include a pipe for conveying fuel to an engine. This transfer pump then also performs the function of a booster pump.

Finally, the invention provides an aircraft having a fuel circuit as described above.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 1 is a diagram showing a fuel circuit having a main tank receiving a filter box;

FIG. 2 is a diagram showing how filter grids are extracted from the FIG. 1 filter box;

FIGS. 3 and 4 are diagrams showing a filter box with at least one slide for closing each inlet and each outlet of a compartment;

FIG. 5 is a diagram showing a fuel circuit having two main tanks and two secondary tanks; and FIG. 6 is a diagram showing a guide rail.

Elements present in more than one of the figures are given the same references in each of them.

DETAILED DESCRIPTION OF THE INVENTION

FIG. 1 shows a fuel circuit 5 of an aircraft 1.

The fuel circuit 5 has at least one main tank 6 in fluid flow communication with at least one secondary tank 7. The main tank 6 is also in fluid flow communication with an engine 2 via a pipe 90, in particular.

The term "pipe" is used to mean a pipe as such or indeed a set of pipes.

The fuel circuit has at least one transfer pump 8 co-operating with an ejector 9 for transferring the fuel stored in a secondary tank 7 to the main tank 6. The transfer pump may also be in communication with the pipe 90 for conveying fuel to the engine 2.

In novel manner, each transfer pump 8 and each ejector 9 of a group of tanks is arranged in the main tank 7 of the group of tanks For example, each transfer pump 8 and each ejector 9 is fastened to a plate 100 that is itself fastened in leaktight manner to a bottom of the main tank, for example.

Furthermore, the fuel circuit includes a filter box 10 in each main tank. Each filter box is interposed between firstly the fuel stored in the main and secondary tanks 6 and 7, and secondly the ejectors 9 and the transfer pumps 8.

Under such circumstances, the invention provides a filter box comprising a casing 10 defining at least one main compartment 20 and at least one secondary compartment 30.

By way of example, the casing 11 has a bottom 14, a top wall 13, and side walls 12 standing in elevation between the bottom 14 and the top wall 13. The filter box can then be fastened on a plate 100, and for example on the plate carrying the transfer pumps and the ejectors. A bottom 14 can also be embodied by a plate 100.

Furthermore, the casing 11 has internal separator walls 15 separating two adjacent compartments.

Each compartment has at least one inlet via which fuel can penetrate into the compartment. In addition, each compartment may possess at least one outlet via which fuel can leave the compartment.

Under such conditions, a filter box has had at least one compartment referred to as the "main" compartment 20.

A main compartment 20 has an inlet referred as "main inlet 21" leading to the main tank 6. Furthermore, a main compartment 20 has an outlet referred to as a "main outlet 22" leading to a transfer pump 8 via a pipe 91, for example.

A transfer pump 8 then sucks in fuel present in the main tank 6. For this purpose, the fuel passes through a main compartment 20 of the filter box 10 and then reaches the transfer pump 8. The transfer pump 8 then delivers the fuel to at least one primary stream inlet of an ejector 9.

A filter box 10 optionally includes only one main compartment 20 connected to at least one transfer pump 8, each transfer pump 8 being connected to at least one ejector 9.

Furthermore, the filter box includes at least one compartment referred to as a "secondary" compartment 30.

A compartment referred to as "secondary compartment 30" has an inlet referred to as a "secondary inlet 31" in fluid flow communication with a secondary tank 7 via a secondary pipe 92. In addition, a secondary compartment 30 is provided with an outlet referred as a "secondary outlet 32" leading to an ejector via a pipe 93, for example. More precisely, the secondary compartment 30 of a filter box 10 leads to a secondary stream inlet of an ejector.

The primary stream of fuel flowing through an ejector under drive from a transfer pump generates suction for fuel present in a secondary tank 7. As a result, fuel passes through a secondary compartment 30 of the filter box 10 and then reaches the ejector 9. The ejector then delivers this fuel together with the received primary stream.

The filter box 10 may include one secondary compartment 30 for each secondary tank 7 that is connected to the main tank 6 receiving the filter box 10. By way of example, a secondary compartment 30 then co-operates with a single ejector 9.

Furthermore, the filter box 10 has one grid 40 per compartment for filtering fuel passing through the compartment. Each grid 40 is thus interposed in a compartment 20, 30 between each inlet and each outlet of that compartment. By way of example, each grid may comprise an open-work assembly and/or porous means for filtering the fuel.

In addition, the filter box includes a system 60 for moving in translation in order to hold a grid in reversible manner in a compartment. Each grid 40 thus co-operates with a system for moving in translation in order to be extracted from a compartment through a slot 23, 33 present in a bottom 14 of the compartment 20, 30.

Such a system 60 for moving in translation may comprise a support 61 secured to a grid 40. The grid may extend in an elevation direction, while the support extends in a plane that is substantially orthogonal to the elevation direction.

Under such circumstances, a support 61 may comprise a plate secured to the grid, either directly or via a leg, for example. The support 61 presents dimensions that are greater than the dimensions of the slot in a compartment in order to close the slot when the grid is present in the compartment.

Furthermore, the support 61 may include at least one gasket 64 for providing good sealing between the support 61 and the bottom 14 of the filter box, or indeed between the support 61 and the plate 100.

In addition, the system 60 for moving in translation includes a fastener system 62 for fastening said support 61 in reversible and leaktight manner. The fastener system 62 may comprise, for example, screw fasteners 63, or the equivalent.

The support may be fastened to the bottom 14 of the filter box or to the plate 100, depending on the arrangement used.

With reference to FIG. 6, at least one system 60 for moving in translation may be provided with at least one guide rail 65 present in a compartment 20, 30 for sliding along double-headed arrow 500.

Furthermore, and with reference to FIG. 1, the filter box includes one leaktight shutter system 50 per compartment 20, 30 in order to prevent fuel from escaping via the slot 23, 33 of a compartment 20, 30 in the event of the grid 40 being absent.

Such a shutter system 50 of a compartment 20, 30 may comprise a resilient system 51 and at least one slide 52. The resilient system may comprise a spring or a block of elastomer material.

Depending on the variant, each slide is designed either to shut the slot of a compartment, or else to shut at least one inlet and/or at least one outlet of the compartment. Thus, each slide 52 co-operates by shape interference with a grid 40 in order to avoid shutting any opening while in an "open" position POS1. The grid then exerts a force going against the force exerted by the resilient system on the slide. For example, a slide may comprise a plate suitable for temporarily shutting an opening.

Conversely, the resilient system positions the slide in a "closed" position POS2 in the absence of a grid 40.

In the embodiment of FIGS. 1 and 2, at least one slide 52 co-operates by shape interference with a slot 23, 33 of a bottom 14 of a compartment 20, 30 in order to shut it in the closed position POS2.

The shutter system then has a slide provided with a plate that is parallel to the bottom 14, for example. The resilient system may include at least one spring interposed between the casing 11 and the slide.

With reference to FIG. 1, when a grid 40 is inserted in a compartment, the grid 40 moves the slide away from the slot through which the grid 40 passes. For example, the grid 40 pushes the slide against the top wall of the casing by compressing the resilient system. The slide is then in the open position POS1.

In order to clean the grid 40, an operator operates the system for moving in translation so as to remove the grids 40 from the filter box along arrows F.

Under such circumstances, the resilient systems push the slides 52 against the slots 23, 33 in order to limit any discharge of fuel from the filter box 10 to the outside. The slides are in the closed position POS2.

It should be observed that each slide may include a sealing gasket 53 pressed against a peripheral casing 11 of the filter box 10 in the closed position POS2.

With reference to FIGS. 3 and 4, at least one slide 52 is suitable for co-operating by shape interference with each inlet 21, 31 and with each outlet 22, 32 of a compartment in order to shut them in said closed position POS2. The shutter system then isolates the inside of the compartment from other members of the fuel circuit.

By way of example, a single slide may shut all of the inlets and all of the outlets of a compartment. At least one slide 52 may include at least one sealing gasket 53.

Furthermore, and with reference to FIG. 5, the fuel circuit 5 is optionally fitted with two main tanks 6 and with two secondary tanks 7 Each main tank 6 is then connected to the secondary tanks 7 via a respective filter box 10 arranged in the main tank 6.

Under such circumstances, each filter box 10 may have two secondary compartments 30 and one main compartment 20.

The main compartment is then connected via at least one main outlet to at least one transfer pump.

Each transfer pump may be in fluid flow communication with two ejectors, each ejector being in fluid flow communication with a secondary compartment.

Furthermore, each transfer pump may be in fluid flow communication with an engine 2.

The main tanks may also be in fluid flow communication with each other via an intercommunication orifice (not shown).

Optionally, an additional secondary compartment of at least one filter box may be connected to an ejector secured to a pipe extending between the two main tanks Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A filter box for filtering fuel upstream from at least one ejector and from at least one fuel transfer pump, wherein said filter box comprises:
    at least one main compartment having a main inlet in fluid flow communication with a main tank, and one main outlet per transfer pump to be fed;
    at least one secondary compartment, each secondary compartment having a secondary inlet for the purpose of being in fluid flow communication with a secondary tank distinct from the main tank, and a secondary outlet for the purpose of being in fluid flow communication with an ejector;
    one grid per compartment for filtering fuel passing through the compartment, each grid co-operating with a system for moving in translation in order to be extracted from said compartment via a slot present in a bottom of the compartment; and
    one leaktight shutter system per compartment having the function of preventing fuel escaping via said slot from a compartment if said grid is absent.

2. A filter box according to claim 1, wherein at least one system for moving in translation includes a support secured to a grid and a fastener system for fastening said support in reversible and leaktight manner.

3. A filter box according to claim 1, wherein at least one system for moving in translation includes at least one guide rail present in a compartment.

4. A filter box according to claim 1, wherein said shutter system of a compartment includes an elastic system and at least one slide, each slide co-operating by shape interference with a grid, said grid pushing the slide into an "open" position (POS1) when said grid is arranged in said compartment, and said system tending to position said slide in a "closed" position (POS2) in the absence of a grid.

5. A filter box according to claim 4, wherein at least one slide co-operates by shape interference with a slot in a bottom of a compartment to shut said compartment in said closed position (POS2).

6. A filter box according to claim 4, wherein at least one slide co-operates by shape interference with each inlet and each outlet of a compartment in order to shut said inlet and said outlet in said closed position (POS2).

7. A filter box according to claim 4, wherein at least one slide includes a sealing gasket pressed against a peripheral casing of the filter box in said closed position (POS2).

8. A filter box according to claim 1, wherein said filter box has two secondary compartments and one main compartment.

9. A fuel circuit for feeding fuel to at least one engine, said fuel circuit being provided with at least one main tank in fluid flow communication with an engine, and at least one secondary tank in fluid flow communication with said main tank, said fuel circuit including at least one transfer pump arranged in said main tank and at least one ejector connected to said transfer pump, wherein the fuel circuit includes a filter box arranged in each main tank, each filter box being in accordance with claim 1, each filter box comprising:
    at least one main compartment provided with a main inlet in fluid flow communication with the main tank receiving the filter box, the main compartment being provided with a main outlet connected to at least one transfer pump arranged in the main tank receiving the filter box;
    at least one secondary compartment, each secondary compartment having a secondary inlet connected to a secondary tank distinct from the main tank and a secondary outlet connected to an ejector that is arranged in the main tank receiving the filter box;
    one grid per compartment for filtering fuel passing through the compartment, each grid co-operating with a system for moving in translation in order to be extracted from said compartment through a slot present in a bottom of the compartment; and
    one leaktight shutter system per compartment for the purpose of preventing fuel escaping via said slot from a compartment in the absence of a grid.

10. A fuel circuit according to claim 9, wherein said filter box includes a single main compartment connected to at least one transfer pump, each transfer pump being connected to at least one ejector.

11. A fuel circuit according to claim 9, wherein at least one filter box includes a secondary compartment co-operating with a single ejector for each secondary tank that is connected to the main tank receiving the filter box.

12. A fuel circuit according to claim 9, wherein said fuel circuit includes two main tanks and two secondary tanks, each main tank being connected to the two secondary tanks via respective filter boxes arranged in the main tanks.

13. A fuel circuit according to claim 9, wherein at least one transfer pump arranged in a main tank includes a pipe for conveying fuel to an engine.

14. An aircraft, wherein the aircraft includes a fuel circuit according to claim 9.

* * * * *